US011034127B2

(12) United States Patent
Klein et al.

(10) Patent No.: US 11,034,127 B2
(45) Date of Patent: Jun. 15, 2021

(54) TRANSPARENT, BIAXIALLY ORIENTED POLYESTER FILM WITH SMOOTH SURFACE ON ONE SIDE AND WITH GOOD WINDABILITY

(71) Applicant: Mitsubishi Polyester Film GmbH, Weisbaden (DE)

(72) Inventors: Dagmar Klein, Ockenheim (DE); Holger Kliesch, Ginsheim (DE); Bodo Kuhmann, Runkel (DE); Artur Michalski, Gal-Algesheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 15/361,598

(22) Filed: Nov. 28, 2016

(65) Prior Publication Data

US 2017/0151746 A1 Jun. 1, 2017

(30) Foreign Application Priority Data

Nov. 30, 2015 (DE) ........................ 102015120760.5

(51) Int. Cl.

| | |
|---|---|
| ***B32B 3/26*** | (2006.01) |
| ***B29C 48/08*** | (2019.01) |
| ***B29C 48/00*** | (2019.01) |
| ***B29C 48/21*** | (2019.01) |
| ***B29C 48/88*** | (2019.01) |
| ***B32B 27/20*** | (2006.01) |
| ***B32B 27/18*** | (2006.01) |
| ***B29C 55/12*** | (2006.01) |
| ***B32B 27/08*** | (2006.01) |
| ***B32B 27/36*** | (2006.01) |
| ***B29K 67/00*** | (2006.01) |
| ***B29K 105/16*** | (2006.01) |
| ***B29K 509/02*** | (2006.01) |
| ***B29L 7/00*** | (2006.01) |

(52) U.S. Cl.

CPC .......... *B32B 3/263* (2013.01); *B29C 48/0018* (2019.02); *B29C 48/022* (2019.02); *B29C 48/08* (2019.02); *B29C 48/21* (2019.02); *B29C 48/914* (2019.02); *B29C 55/12* (2013.01); *B32B 27/08* (2013.01); *B32B 27/18* (2013.01); *B32B 27/20* (2013.01); *B32B 27/36* (2013.01); *B29K 2067/00* (2013.01); *B29K 2105/16* (2013.01); *B29K 2509/02* (2013.01); *B29L 2007/008* (2013.01); *B32B 2250/03* (2013.01); *B32B 2250/04* (2013.01); *B32B 2250/05* (2013.01); *B32B 2250/24* (2013.01); *B32B 2250/244* (2013.01); *B32B 2264/10* (2013.01); *B32B 2264/104* (2013.01); *B32B 2272/00* (2013.01); *B32B 2307/00* (2013.01); *B32B 2307/40* (2013.01); *B32B 2307/406* (2013.01); *B32B 2307/412* (2013.01); *B32B 2307/51* (2013.01); *B32B 2307/518* (2013.01); *B32B 2307/538* (2013.01); *B32B 2479/00* (2013.01)

(58) Field of Classification Search

CPC .............. B29C 47/065; B29C 47/0021; B29C 47/0004; B29C 55/12; B29C 47/8845; B29K 2067/00; B29K 2105/16; B29K 2509/02; B29L 2007/008; B32B 3/263; B32B 27/18; B32B 27/20; B32B 27/08; B32B 27/36; B32B 2307/538; B32B 2307/00; B32B 2272/00; B32B 2264/10; B32B 2250/24; B32B 2250/05; B32B 2250/04; B32B 2307/51; B32B 2307/40; B32B 2250/03; B32B 2250/244; B32B 2264/104; B32B 2307/412; B32B 2307/518; B32B 2479/00; B32B 2307/406

See application file for complete search history.

(56) References Cited

U.S. PATENT DOCUMENTS

| | | | | |
|---|---|---|---|---|
| 6,017,612 A * | 1/2000 | Yoshihara | B32B 27/36<br>156/239 |
| 6,238,782 B1 * | 5/2001 | Hellmann | B32B 27/36<br>428/216 |
| 6,551,686 B1 * | 4/2003 | Hellmann | B32B 27/36<br>156/244.24 |
| 2002/0039646 A1 * | 4/2002 | Peiffer | B32B 27/36<br>428/216 |
| 2003/0049472 A1 * | 3/2003 | Murschall | B32B 27/36<br>428/480 |
| 2004/0076818 A1 * | 4/2004 | Janssens | B32B 27/20<br>428/323 |
| 2010/0247889 A1 * | 9/2010 | Kliesch | C08J 7/065<br>428/220 |

(Continued)

FOREIGN PATENT DOCUMENTS

| | | |
|---|---|---|
| EP | 0 460 640 A1 | 12/1991 |
| EP | 1 884 357 A1 | 12/1998 |

(Continued)

*Primary Examiner* — Nathan L Van Sell
(74) *Attorney, Agent, or Firm* — ProPat, LLC

(57) ABSTRACT

The invention relates to an at least three-layer biaxially oriented polyester film including at least one base layer B, one rough outer layer A and one smooth outer layer C, where the layers A and C are external layers arranged on opposing surfaces of the base layer B. The outer layer A includes calcium carbonate particles. The outer layer C includes less than 0.1% by weight of particles (where the percentage by weight data are based on the weight of the layer). The polyester used to produce all of the layers includes no 2,6-naphthalenedicarboxylic-acid-derived units as repeating units. The entire film includes less than 0.3% by weight (based on the weight of the entire film) of particles. The invention further relates to processes for producing the film, and also to use of the latter as process film for the provision of surface properties, in particular for furniture surfaces.

36 Claims, No Drawings

(56) References Cited

U.S. PATENT DOCUMENTS

2011/0305913 A1* 12/2011 Hinton ................ B29C 47/0021
428/480
2015/0183963 A1* 7/2015 Maeba .................. C01F 11/185
524/427

FOREIGN PATENT DOCUMENTS

EP 0 947 982 A2 10/1999
EP 0 983 844 A2 3/2000
EP 1 410 905 A1 4/2004

* cited by examiner

TRANSPARENT, BIAXIALLY ORIENTED POLYESTER FILM WITH SMOOTH SURFACE ON ONE SIDE AND WITH GOOD WINDABILITY

CROSS-REFERENCE TO RELATED APPLICATIONS

This application claims priority to German Patent Application 10 2015 120 760.5 filed Nov. 30, 2015 which is hereby incorporated herein by reference in its entirety.

FIELD OF THE INVENTION

Biaxially oriented, at least three-layer, polyester film is provided which is smooth on one side and has at least one external layer comprising calcium carbonate particles, and process for production thereof, and use thereof as process film for the provision of surface properties, in particular for furniture surfaces.

The present invention relates to a biaxially oriented polyester film which is smooth on one side and has high transparency and, opposite to the smooth side, an external layer with a calcium carbonate particle as process auxiliary, with total thickness from 12 to 75 μm. The film of the invention has excellent suitability for the provision of a smooth, high-gloss surface to lacquers of the type in particular desirable for furniture surfaces. The smooth side here is substantially particle-free.

BACKGROUND OF THE INVENTION

A particularly smooth, high-gloss surface is desirable for design-related reasons in many applications, in particular lacquers in the furniture sector, but also other plastics surfaces, for example of PU mouldings. However, surface unevenness frequently arises in these lacquers or plastics during application, and in practice a smooth template is frequently used, and transfers its surface to the lacquer or moulding. An example of a suitable template is a polyester film, which must be very smooth at least on one side in order to guarantee a particularly flat and uniform surface with high gloss.

However, these films necessarily comprise, opposite to the smooth side, a rougher surface which permits or facilitates transport of the film in the production process and handling of the film during subsequent processing. Two pigment-free surfaces would moreover stick to one another on the wound roll and can then sometimes be impossible to unwind without surface damage.

Films with a smooth surface on one side are known in the prior art: EP-A-1 410 905 by way of example describes a multilayer polyester film which has a particle-free surface. EP-A-1 410 905 describes the use of silicon dioxide particles with particle size up to 4.0 μm in the rough side. Silicon dioxide particles are hard and, under pressure, lead to surface deformation which is also found on the opposite, smooth side if the distance between the particle-containing layer boundary and the upper side of the smooth layer is less than 8 μm. When the film is wound, furthermore, these hard particles force themselves into the smooth layer and thus cause a depression in the said smooth layer. The particles cause visible damage to the lacquer.

EP-A-1 884 357 likewise describes a polyester film which is smooth on one side, has a particle-free surface, and on the opposite surface comprises, as process aid, an incompatible polymer which provides the desired surface roughness, but also renders the film highly opaque. Because of the substantial opacity, it becomes substantially more difficult to harden the lacquer by using light, for example by UV curing, and process control methods requiring transmission through the film prior to take-off cannot be used.

SUMMARY OF ADVANTAGEOUS EMBODIMENTS OF THE INVENTION

It was therefore an object of the present invention to provide a biaxially oriented polyester film which is smooth on one side and which, on the opposite side, comprises a suitable particle system which not only permits cost-effective production of the film but also permits further processing, and moreover leads to low opacity of the film.

DETAILED DESCRIPTION OF ADVANTAGEOUS EMBODIMENTS OF THE INVENTION

The said object is achieved via an at least three-layer biaxially oriented polyester film comprising at least one base layer B, one rough outer layer A and one smooth outer layer C, where the outer layers A and C are respective external layers arranged on the opposite surfaces of the base layer B, where the outer layer A comprises calcium carbonate particles, the outer layer C comprises less than 0.1% by weight of particles (where the percentage by weight data are based on the weight of the respective layer) and where the polyester used for the production of all of the layers of the at least three-layer polyester film comprises, as repeating unit, no 2,6-naphthalenedicarboxylic-acid-derived units, and where the entire film comprises less than 0.3% by weight (based on the weight of the entire film) of particles.

This film has the following properties:

transparency from 80 to 95% haze $<7\%$ total film thickness from 12 to 75 μm a smooth outer layer with roughness value $Sa<25$ nm, $Sp<500$ nm a smooth outer layer which comprises less than 0.1% by weight of particles a smooth outer layer with thickness at least 1 μm a rough outer layer with roughness value $Sa\geq 25$ nm, $Sp\geq 500$ nm where the rough outer layer comprises calcium carbonate particles of size $d_{50}$ from 0.7 μm to 1.5 μm and from 0.1 to 0.7% by weight particle content.

Total film thickness is at least 12 μm and at most 75 μm. Film thickness is preferably at least 19 μm and at most 55 cm, and ideally at least 20 μm and at most 25 μm. If film thickness is below 12 μm, stiffness is insufficient to permit uniform application to the surface, and to guarantee uniform transfer of the lacquer to the underlying substrate. Above 75 μm, the film becomes too stiff, and no longer achieves sufficient contact with the substrate.

The film has at least three layers, has a smooth external layer, and has an opposite external layer comprising calcium carbonate particles. Between these, there is at least one base layer and there may be other intermediate layers.

It is not possible to use a structure of only two layers, without the base layer, because then either the particle-containing layer would have to be too thick, with resultant poor optical properties (transparency, haze) or the smooth layer would be too thick, and this would make it impossible to achieve cost-effective return of regrind into the particle-containing layer.

The proportion of the base layer, based on total film thickness, is at least 60%, preferably at least 70% and particularly preferably at least 80%. This facilitates cost-effective return of the regrind arising.

The thickness of the particle-containing outer layer A is preferably no less than 0.8 μm and at most 2.5 μm, particularly preferably from 1.0 μm to 2.3 μm and very particularly preferably from 1.4 μm to 2.1 μm. Below 0.8 μm it is difficult to achieve a sufficiently good winding result with the suitable particle contents described at a later stage below. The quantity of pigment may then be insufficient. Above 2.5 μm no further improvement of winding result is achieved through thickness increase, and introduction of the particles leads to an undesirable increase of haze and low transparency of the film.

The thickness of the smooth, substantially particle-free outer layer is preferably at least 1.8 μm, particularly preferably at least 2.0 m, very particularly preferably at least 2.3 μm. In principle, a further increase of the thickness of the substantially particle-free layer up to 7.0 μm provides a further improvement of the surface, but thereabove no further improvement is achieved. Below 1.8 μm particles from the base layer force themselves through the outer layer and produce undesirable elevations.

The regrind arising during film production can be introduced either into the particle-containing outer layer A or into the base. It is preferable that the regrind is introduced only into the base layer, in order that the particle-containing regrind introduced causes no, or only slight, impairment of the surface.

If the outer layers become too thick, cost-effectiveness decreases, since regrind should preferably be introduced into the base and if base thickness is too low in comparison with the total thickness of the said layers it then becomes necessary to introduce an excessive percentage of regrind in order to complete the regrind cycle.

The outer layer A comprises a quantity of calcium carbonate particles that is preferably from 0.1% by weight to 0.7% by weight, particularly preferably from 0.2% by weight to 0.6% by weight and very particularly preferably from 0.3% by weight to 0.45% by weight. Below 0.1% by weight the particles cannot provide sufficient aid to winding. Above 0.7% by weight there is the risk that agglomerates will form, and during winding these can force themselves into the opposite, smooth layer C. The diameter of the particles is preferably from 0.7 μm to 1.5 μm, particularly preferably from 0.8 μm to 1.3 μm and very particularly preferably from 0.9 μm to 1.2 μm. Particles smaller than 0.7 μm lead to a significantly poorer winding result, and particles larger than 1.5 μm lead, during winding, to deep impressions in the smooth layer that is then opposite.

It is preferable here to use particles that are synthetic and not natural, because a more uniform particle distribution can be achieved during production of synthetic calcium carbonate particles. It is particularly preferable here to use surface-modified calcium carbonate particles, in particular vaterite, these particles being described in EP-A-0 460 640. These particles are obtainable by way of example from Maruo Calcium Co., Ltd. 1455 Nishioka, Uozumi-cho, Akashi City, Hyogo. The surface treatment here leads to better binding of the calcium carbonate particles into the polyester matrix and thus to higher transparency and lower haze, these being advantageous for applications where UV curing (e.g. of lacquer) through the film is intended.

The total quantity of particles, based on the total weight of the film, is at most 0.3% by weight, preferably at most 0.28% by weight and particularly preferably at most 0.25% by weight. As particle content increases, haze increases and the transparency decreases, with the adverse effect described on UV hardening.

For the purposes of the invention, the quantity comprised of polymers that have whitening effect and are incompatible with the polyester main constituent, for example polypropylene, COCs, polyethylene, polystyrene, etc. are less than 0.3% by weight and ideally zero (0% by weight), because these lead to a significant increase of haze and decrease of transparency.

The quantity comprised of whitening particles, such as titanium dioxide and barium sulphate, in the film is less than 0.2% by weight, preferably less than 0.1% by weight and ideally zero (0% by weight), because they greatly reduce transparency in particular in the UV region.

The film can comprise not only the calcium carbonate of the invention but also other particles, e.g. silicon dioxide or aluminium trioxide, the content of those particles preferably being <0.3% by weight, particularly preferably <0.25% by weight and in particular less than 0.01% by weight, based on the total weight of the film. Particles other than the preferred calcium carbonate reduce transparency and increase haze, and moreover there is an increased risk that agglomerates will form, with consequent impressions in the smooth side of the film.

The layer C forming the smooth side of the film preferably comprises <0.1% by weight of intentionally added particles, based on the layer C, particularly preferably <0.01% by weight and in particular no intentionally added particles at all. All particles in the layer C increase surface roughness and lead to impressions in the transferred lacquer. The layer C can comprise particles which derive from the catalyst used in the production of the polyester. In order that the quantity of these particles is also substantially reduced, it is preferable that the layer C uses the polymers described at a later stage below.

The polymer of the base layer B and of the other layers is preferably comprised of at least 90% by weight of a thermoplastic polyester, particularly preferably 95% by weight. Preference is given here to a polyester made of ethylene glycol and terephthalic acid (=polyethyleneterephthalate, PET). Polyesters comprising naphthalene-2,6-dicarboxylic acid as repeating unit are not suitable because these lead to undesirable UV absorption. In particular, this is of importance when the proportion of the naphthalene units in the base layer is above 3 mol %. The polyester can comprise other monomers, such as isophthalic acid or cyclohexane dimethanol or ethylene glycol. The isophthalic acid content in the outer layers is <23% by weight, particularly preferably <19% by weight and in particular <15% by weight, because otherwise there is the risk of polyester transfer on the lacquer. The proportion of cyclohexane dimethanol is preferably <2% by weight because the mechanical properties of the film are adversely affected thereby. In a preferred embodiment the outer layers comprise <2% by weight, very particularly preferably <1.5% by weight, of monomers other than ethylene glycol and terephthalic acid, because when other monomers are used there is the risk of solvation of the film surface during application of the lacquer.

For the purposes of the invention it is preferable to use polyesters produced by the PTA route (purified terephthalic acid), because use of DMT (dimethylterephthalate) polyesters generally produces more UV-active by-products, which are undesirable for the reasons mentioned. In a preferred embodiment the polymer of the outer layers comprises no calcium as transesterification catalyst and no antimony as polycondensation catalyst, because these tend to form large catalyst precipitates which can lead to impressions in the smooth layer C. It is preferable that the two external layers comprise polymers comprising titanium compounds as polycondensation catalyst and magnesium compounds or manganese compound as transesterification catalysts.

The SV value of the polyester for production of the film of the invention is advantageously selected in such a way that the SV value of the film is >600, preferably >650 and ideally >700. The SV value of the film here is preferably <950 and particularly preferably <850. If the SV value is below 600, the brittleness of the film, even during the production process, is so great that frequent break-offs occur. Furthermore, the mechanical strength values mentioned at a later stage below are not reliably achieved when the SV value is lower. If the SV of the film is higher than 950, the viscosity of the polymer in the extruder increases to an extent that produces excessively high flow rates, and pressure variations occur during extrusion. This leads to poor reliability. There is moreover a disproportionately high level of abrasion of extrusion dies and cutters.

The film must moreover have high transmittance in the wavelength range from 330 nm to 400 nm. At every wavelength in the stated range this is greater than 50%, preferably greater than 60% and ideally greater than 72% (for procedure see test methods).

As transparency in the UV region increases, UV hardening of the lacquer through the film is achieved more rapidly and more completely. UV transparency here is reduced by the total quantity of particles introduced (see above), and is also influenced by the selection of the polyester. Among polyethylene terephthalates, polymers produced by the PTA route have proved to be superior here to those produced by the DMT route. A particularly unsuitable procedure is use of dimethyl naphthalate as monomer or introduction of UV stabilizers or optical brighteners into the film.

Yellow dyes moreover reduce UV-permeability. Yellow degradation products can also be produced during recycling of the polyester film. The proportion of returned regrind is therefore preferably less than 70% by weight, particularly preferably less than 60% by weight, in particular less than 55% by weight, based on the total weight of the extrudate (polyester plus all additional substances) in all of the layers. The Yellowness Index YID of the film is preferably less than 3.0, particularly preferably <2.0 and ideally <1.7. These values can be achieved by using the particles and polymers of the invention. If by way of example other materials are used, e.g. incompatible polymers such as COC or polypropylene, or barium sulphate particles, it is difficult to impossible to achieve the said values.

Alongside the transparency in the UV region, the transparency of the film in accordance with ASTM D1003-61 in the visible wavelength region is from 80% to 95%, preferably at least 85%, particularly preferably being 88%, because this facilitates inspection, through the film, of the substrate and of the applied lacquer. For the same reason, haze is preferably <7%, particularly preferably <6% and in particular <5%. Higher haze moreover impairs UV hardening.

The transparency and haze of the invention is achieved via selection of the particles (in particular the particle size) and via the particle content (and sometimes also via the distribution of the particles across the layers, see above), and also via suitable polymers and the production process below.

The roughness of the film is of particular importance for use of the film of the invention in the application below. Roughness here is expressed via the Sa value of the smooth outer layer C of <25 nm and Sp of <500 nm, preferably Sa<23 nm and Sp<450 nm, particularly preferably Sa<20 nm and Sp<400 nm. As the values for Sa and Sp decrease, the surface uniformity of the transferred lacquer increases, as also therefore does its gloss.

The roughness values of the outer layer A provided with particles are Sa from 25 nm to 60 nm and Sp from 500 nm to 1500 nm, preferably Sa from 30 nm to 55 nm and Sp from 520 nm to 1000 nm, particularly preferably Sa from 35 nm to 55 nm and Sp from 550 nm to 900 nm. If the Sa value and Sp value is less than 25 nm and, respectively, 300 nm, the winding result achieved is insufficient, i.e. creases, longitudinal corrugations and other distortion effects occur, and can be transferred to the substrate. If the roughness values Sa and Sp are greater than the maximal values, the particles become impressed into the smooth layer, and can lead to insufficient surface quality of the lacquer. The roughness values described are achieved via use of the particles of the invention (in particular the particle size) and via the particle content, and also via the distribution of the particles across the layers, see above, and also via suitable polymers and the process below.

The modulus of elasticity of the film of the invention in both film directions (TD and MD) is moreover greater than 3000 N/mm and preferably greater than 3500 N/mm$^2$ and particularly preferably (in at least one film direction) >4000 N/mm$^2$, longitudinally and transversely. The F5 values (force at 5% elongation) are preferably longitudinally and transversely above 80 N/mm$^2$ and particularly preferably above 90 N/mm$^2$. These mechanical properties can be established and maintained via variation of the parameters in biaxial stretching of the film in the context of the process conditions stated below.

When films with the mechanical properties mentioned are used under tension, they are not subject to disproportionate elongation, and they retain good running properties.

Production Process

The polyester polymers of the individual layers are produced by polycondensation, either starting from dicarboxylic acids and diol or—although less preferably—starting from the esters of the dicarboxylic acid, preferably the dimethyl esters, and diol. Polyesters that can be used preferably have SV values in the range from 500 to 1300; the individual values are of relatively little importance here, but the average SV value of the polymers used must be greater than 700 and is preferably greater than 750. These values are advantageously used to achieve the SV values described above for the film.

The calcium carbonate particles can be added before production of the polyester is complete. For this, the particles are dispersed in the diol, optionally ground, decanted or/and filtered, and added to the reactor, either in the (trans)esterification step or in the polycondensation step. It is possible, less preferably, to produce a concentrated particle-containing polyester masterbatch by using a twin-screw extruder, and to dilute this with particle-free polyester during film extrusion. This is less preferred because it involves increased risk that agglomerates will form. It has proved advantageous here to avoid use of masterbatches comprising less than 30% by weight of polyester. Another possibility—although again less preferable—consists in direct addition of particles during film extrusion in a twin-screw extruder.

If single-screw extruders are used, it has then proved advantageous to predry the polyesters. The drying step can be omitted if a twin-screw extruder with devolatilization zone is used.

The polyester of the individual layers is first compressed and rendered flowable in the extruders. In a preferred embodiment the melt temperatures (temperature measured in the melt at the extruder outlet) are from 290° C. to 300° C. At temperatures above 300° C. the Yellowness Index increases; at temperatures below 290° C. there is increased risk of unmelted polymer fractions which can lead to undesirable surface elevations. This temperature is established by way of the throughput-to-rotation-rate ratio of the extruder and/or by way of the temperatures of the extruder heating system. These respective conditions and temperatures are dependent on the type of extruder used and should be adjusted by the person skilled in the art with reference to the parameters mentioned. The melts are then shaped in a coextrusion die to give flat melt films, forced through a flat-film die, and drawn off on a chill roll and on one or more take-off rolls, where they cool and harden.

The film of the invention is biaxially oriented, i.e. biaxially stretched. The biaxial stretching of the film is most frequently carried out sequentially. It is preferable here that stretching is carried out first longitudinally (i.e. in machine direction=MD) and then transversely (i.e. perpendicularly to machine direction=TD). The longitudinal stretching can be carried out with the aid of two rolls running at different speeds corresponding to the desired stretching ratio. The transverse stretching is generally achieved by using an appropriate tenter frame.

The temperature at which the stretching is carried out can vary relatively widely, and depends on the desired properties of the film. The longitudinal stretching is generally carried out in the temperature range from 80° C. to 130° C. (heating temperatures from 80° C. to 130° C.), and the transverse stretching is generally carried out in the temperature range from 90° C. (start of stretching) to 140° C. (end of stretching). The longitudinal stretching ratio is in the range from 2.5:1 to 4.5:1, preferably from 2.8:1 to 4.0:1. A stretching ratio above 4.5 leads to significantly increased difficulty in production (break-offs). The transverse stretching ratio is generally in the range from 2.5:1 to 5.0:1, preferably from 3.2:1 to 4:1. For achievement of the desired film properties it has proved advantageous for the stretching temperature (in MD and TD) to be below 125° C., and preferably below 118° C. Before the transverse stretching, one or both surfaces of the film can be in-line-coated by the processes known per se. In a preferred embodiment the film is uncoated on the unpigmented side, and in a particularly preferred embodiment is uncoated on both sides. Every coating brings the risk of "strike-off" (=transfer) of coating or coating components onto the lacquer and thus onto the finished component. This is undesirable.

In the heat-setting that follows, the film is maintained under tension for a period of about 0.1 s to 10 s at a temperature of from 150° C. to 250° C. The film is then wound up in conventional manner.

Use

The films of the invention have excellent suitability as process auxiliary film for the production/provision of smooth lacquer surfaces, in particular if the lacquers are UV-cured. The lacquer here is applied to the film or to the component, application to the component being preferred. In this case, the smooth side of the film is then applied under tension to the lacquer; otherwise the film with the lacquer is applied to the component.

It is preferable that the components are flat (with no great deformation). Excessive elongation of the film during application is to be avoided. The lacquer on the component is then cured through the film by UV radiation. The film is then peeled away.

Analysis

The following values were measured in order to characterize the raw materials and the films:

Measurement of the Median Particle Diameter $d_{50}$

Median diameter $d_{50}$ is determined on the particle to be used by means of a Malvern MASTERSIZER® 2000.

For this, the samples are placed in a cell with water, and the cell is then placed in the test equipment. A laser is used to analyze the dispersion, and the particle size distribution is determined from the signal via comparison with a calibration curve. Particle size distribution is characterized by two parameters, the median value $d_{50}$ (=measure of position of the central value) and the degree of scattering, the value known as SPAN98 (=measure of scattering of the particle diameter). The test procedure is automatic, and also includes mathematical determination of the $d_{50}$ value. The $d_{50}$ value here is defined as being determined from the (relative) cumulative particle size distribution curve: the point of intersection of the 50% ordinate value with the cumulative curve provides the desired $d_{50}$ value on the abscissa axis.

SEM or TEM measurements on the film produced by using these particles give a median particle diameter that is on average lower by from 15 to 25% than that of the particles used. The diameter of the particles in the film can therefore be calculated from the diameters of the particles used to produce the film.

UV/Visible Spectra/Transmittance at Wavelength x

The films were measured in transmission in a UV/visible twin-beam spectrometer (Lambda 12 or 35) from Perkin Elmer USA. For this, a flat-sample holder is used to insert a film sample measuring about (3×5) cm into the beam path, perpendicularly with respect to the measuring beam. The measuring beam passes by way of a 50 mm Ulbricht sphere to the detector, where intensity is determined for the determination of transparency at a desired wavelength.

The background material used is air. Transmittance at the desired wavelength is read.

Haze, Transparency

The test serves to determine haze and transparency of plastics films for which optical clarity/haze is significant for functional value. The measurement is made in accordance with ASTM D1003-61 in a haze-gard XL-21 1 haze metre from BYK Gardner.

Yellowness Index

Yellowness Index YID is the deviation from the colourless state in the "yellow" direction, and is measured in accordance with DIN 6167.

SV (Standard Viscosity) Value

Standard viscosity SV (DCA) was measured by a method based on DIN 53 726 at a concentration of 1% in dichloroacetic acid in a Ubbelohde viscometer at 25° C. The dimensionless SV value is determined as follows from relative viscosity ($\eta_{rel}$):

$$SV=(\eta_{rel}-1)\times 1000$$

For this, film or polymer was dissolved in DCA. Particle content was determined by ashing and corrected via appropriate increase of input weight, i.e.:

input weight=(specified input weight)/((100 particle content in % by weight)/100)

Mechanical Properties

Mechanical properties were determined by way of a tensile test using a method based on DIN EN ISO 572-1 and -3 (sample type 2) on film strips measuring 100 mm×15 mm.

Visual Assessment of Surface Quality of the Smooth Side C after Winding

The film produced is stored on the wound customer roll for at least 5 days, and then 20 metres are unwound from the top of the roll and an area of at least 3 $m^2$ within the subsequent metres was subjected to visual inspection. For this, the film was laid on a table with smooth surface in such a way that the smooth film surface is directed away from the table. At least three test personnel inspect the said film surface under a high-powered lamp at various angles between 10° and 90°. If this method reveals uneven areas in the film surface, these are marked and then analyzed in an electron microscope. The number of elevations/depressions thus found is evaluated as number per $m^2$. The following evaluation grades apply here: very poor, poor, moderate and good. Very poor means 20 elevations and depressions/$m^2$, poor means L 10 elevations and depressions/$m^2$, moderate means 5 elevations and depressions/$m^2$ and good means <5 elevations and depressions/$m^2$.

Roughness values Sa and Sp

A Contour GT-K/A white light interferometry microscope from Bruker was used to determine the topography of the surface in accordance with ISO 25178-2. An area of 0.95 mm×1.27 mm (480×640 pixels) was subjected to measurement at 5.1× magnification. For the measurement, a piece of film measuring 10×10 cm is placed on the microscope stage, and fixed by using the weight of a metal ring of diameter 5 cm. Measurement was made in VSI mode (phase shifting interferometry). Measurement length in the z-direction was set to 25 μm. Any possible undulation of the sample is filtered out. Absent measured values on the sides of the elevations are supplemented by computation (data restore).

Sa is the arithmetic average of the absolute ordinate values within the defined range (A).

$$Sa = \frac{1}{A}\int\int_A |z(x, y)|\,dxdy$$

The maximal peak height Sp is the largest value of peak height within the defined range. Since the measured value Sp is sensitive to outliers, at least five measurements are carried out on a sample and all measurements with a deviation in Sp of +50% from the average of all of the measurements are discarded. The resultant average of the remaining measurements is stated as Sp value.

EXAMPLES

Inventive Examples 1-4 and CEs 1-6

The polymer mixtures are melted at 292° C. and, after passing through a flat-film die, applied electrostatically to a chill roll controlled to 50° C. They are then subjected to longitudinal stretching, followed by transverse stretching, under the following conditions:

| | | | |
|---|---|---|---|
| Longitudinal stretching | Heating temperature | 75-115 | ° C. |
| | Stretching temperature | 115 | ° C. |
| | Longitudinal stretching ratio | 3.8 | |
| Transverse stretching | Heating temperature | 100 | ° C. |
| | Stretching temperature | 112 | ° C. |
| | Transverse stretching ratio (inclusive of stretching in 1st setting field) | 3.8 | |
| Setting | Temperature | 237-150 | ° C. |
| | Duration | 3 | s |
| Setting | Temperature of 1st setting field | 170 | ° C. |

The following polymers are used in the Examples:

PET1=polyethylene terephthalate made of ethylene glycol and terephthalic acid with SV value 820.

PET2=polyethylene terephthalate made of ethylene glycol and terephthalic acid with SV value 790. The polymer comprises 1% by weight of vaterite calcium carbonate from the producer Maruo, surface-treated as described in the Patent EP-A-0 460 640 with median particle diameter 1.0 μm.

PET3=polyethylene naphthalate made of ethylene glycol and 1,6-naphthalenedicarboxylic acid.

PET4=polyethylene terephthalate with SV value 700 and 10% by weight of SYLYSIA® 310 P silicon dioxide particles with $d_{50}$ 2.7 μm (producer FUJI SILYSIA CHEMICAL LTD. Greenville NC/USA). The $SiO_2$ was incorporated into the polyethylene terephthalate in a twin-screw extruder.

PET5=polyethylene terephthalate with SV 710, comprising 25 mol % of isophthalic acid as comonomer.

PET6=cycloolefin copolymer (COC) from Ticona: TOPAS® 6015S (COC comprised of 2-norbornene and ethylene with glass transition temperature $T_g$ about 160° C.).

Table 1 below collates the formulations, production conditions and resultant film properties:

TABLE 1

| | | Inv. Ex. 1 | Inv. Ex. 2 | Inv. Ex. 3 | Inv. Ex. 4 | CE1 | CE2 | CE3 | CE4 | CE5 | CE6 |
|---|---|---|---|---|---|---|---|---|---|---|---|
| Layer | Film thickness | 23 | 12.8 | 50 | 23 | 23 | 23 | 23 | 23 | 23 | 23 |
| | Thickness of A | 1.8 | 1.9 | 2 | 1.8 | 1.8 | 1.8 | 1.8 | 1.8 | 1.8 | 1.8 |
| | Thickness of B | 18 | 9 | 43 | 18 | 18 | 18 | 18 | 18 | 18 | 18 |
| | Thickness of C | 3.2 | 1.9 | 5 | 3.2 | 3.2 | 3.2 | 3.2 | 3.2 | 3.2 | 3.2 |
| | Coating | none | none | none | none | Acrylate on both sides in line as in EP0144948 | none | none | none | none | none |

TABLE 1-continued

| | | Inv. Ex. 1 | Inv. Ex. 2 | Inv. Ex. 3 | Inv. Ex. 4 | CE1 | CE2 | CE3 | CE4 | CE5 | CE6 |
|---|---|---|---|---|---|---|---|---|---|---|---|
| Layer A | PET 1 (%) | 60 | 70 | 60 | 40 | 60 | 60 | 95 | 96 | 60 | 60 |
| | PET 2 (%) | 40 | 30 | 40 | 60 | 40 | 40 | 5 | | 40 | 40 |
| | PET 3 (%) | | | | | | | | | | |
| | PET 4 (%) | | | | | | | | 4 | | |
| | PET 5 (%) | | | | | | | | | | |
| | PET 6 (%) | | | | | | | | | | |
| Layer B | PET 1 (%) | 60 | 60 | 60 | 60 | 60 | 60 | 60 | 60 | 50 | 55 |
| | PET 2 (%) | | | | | | | | | | |
| | PET 3 (%) | | | | | | | | | 20 | |
| | PET 4 (%) | | | | | | | | | | |
| | PET 5 (%) | | | | | | | | | | |
| | PET 6 (%) | | | | | | | | | | 5 |
| | Self-regrind (%) | 40 | 40 | 40 | 40 | 40 | 40 | 40 | 40 | 30 | 40 |
| Layer C | PET 1 (%) | 100 | 100 | 100 | 100 | 100 | 30 | 100 | 100 | 100 | 100 |
| | PET 2 (%) | | | | | | | | | | |
| | PET 3 (%) | | | | | | | | | | |
| | PET 4 (%) | | | | | | | | | | |
| | PET 5 (%) | | | | | | 70 | | | | |
| | PET 6 (%) | | | | | | | | | | |
| Transparency (centre of web) | in % | 90 | 91 | 90 | 89 | 92 | 90.3 | 91 | 91 | 90 | 90 |
| Haze | | 3 | 2.1 | 2.7 | 3.5 | 3.5 | 3 | 1.4 | 1.8 | 3.2 | 10 |
| Yellowness Index YID | | 1.3 | 1.1 | 1.3 | 1.5 | 1.3 | 1.3 | 1.2 | 1.2 | 2 | 3.7 |
| Modulus of elasticity MD | N/mm2 | 4600 | 4700 | 4200 | 4650 | 4600 | 4400 | 4600 | 4800 | 4700 | 4500 |
| Modulus of elasticity TD | N/mm2 | 5000 | 4900 | 5100 | 4900 | 5000 | 4800 | 5000 | 4900 | 4800 | 4850 |
| F5 MD | N/mm2 | 115 | 114 | 110 | 112 | 115 | 110 | 115 | 110 | 117 | 112 |
| F5 TD | N/mm2 | 104 | 102 | 105 | 105 | 104 | 100 | 104 | 115 | 105 | 100 |
| SV of film | | 740 | 750 | 745 | 735 | 740 | 720 | 760 | 750 | 755 | 725 |
| Transparency minimum between 330 and 400 nm | in % | 76 | 77 | 66 | 70 | 76 | 76 | 77 | 80 | 10 | 76 |
| Roughness value Sa of side A | nm | 48 | 50 | 47 | 50 | 47 | 46 | 20 | 57 | 49 | 98 |
| Roughness value Sp of side A | nm | 790 | 850 | 580 | 880 | 800 | 795 | 250 | 3065 | 812 | 795 |
| Roughness value Sa of side C | nm | 14 | 16 | 6 | 15 | 14 | 18 | 10 | 22 | 14 | 10 |
| Roughness value Sp of side C | nm | 268 | 310 | 150 | 293 | 364 | 410 | 197 | 1350 | 272 | 348 |
| Visual assessment | | good | moderate | good | good | good | moderate | good | very poor | good | good |
| Winding result | | good | good but close to limit | good | good | good | not good | poor | good | good | good |
| Comment | | | | | | Furniture boards produced have visual defects caused by transferred coating components. | Isolated areas of surface damage discernible on the furniture board, believed to be caused by transfer from the smooth side C, because this layer is too amorphous. | Film cannot be wound without defects. | Film cannot be used to produce surfaces for furniture, because lacquer has many defects. | Hardening of lacquer through the film not possible within an appropriate period during processing. | Insufficient hardening during the course of the production process for a furniture surface. |

That which is claimed:

1. At least three-layer biaxially oriented polyester film comprising at least one base layer B, one rough outer layer A and one smooth outer layer C, where the outer layers A and C are respective external layers arranged on the opposite surfaces of the base layer B, where the outer layer A comprises calcium carbonate particles, the outer layer C comprises less than 0.1% by weight of particles, where the percentage by weight data are based on the weight of the respective layer, and where the polyester used for the production of all of the layers of the at least three-layer polyester film comprises, as repeating unit, no 2,6-naphthalenedicarboxylic-acid-derived units, and where the entire film comprises less than 0.3% by weight, based on the weight of the entire film, of particles, the smooth outer layer C has a roughness, Sa, of less than 25 nm, the particles within said film consist of calcium carbonate and, optionally, polyester-catalyst residue, and the film has a transparency of from 80 to 95%.

2. Polyester film according to claim 1, wherein the rough outer layer A comprises from 0.1 to 0.7% by weight based on the weight of the outer layer A, of calcium carbonate particles of size $d_{50}$ from 0.7 μm to 1.5 μm, as measured before film production.

3. Polyester film according to claim 1, wherein the calcium carbonate particles are synthetic and not natural particles.

4. Polyester film according to claim 3, where the calcium carbonate particles are surface-modified particles.

5. Polyester film according to claim 1, wherein the film comprises particles consisting of the calcium carbonate particles and the polyester catalyst residue particles.

6. Polyester film according to claim 1, wherein the outer layer C comprises <0.1% by weight of intentionally added particles, whereby the weight of the intentionally added particles is based on the weight of the outer layer C.

7. Polyester film according to claim 6, wherein the outer layer C comprises <0.01% by weight of said intentionally added particles, based on the weight of the outer layer C.

8. Polyester film according to claim 6, wherein the outer layer C comprises 0.0% by weight of said intentionally added particles, based on the weight of the outer layer C.

9. Polyester film according to claim 1, wherein the outer layer C comprises only particles that may occur as catalyst residues in the production of the polyester.

10. Polyester film according to claim 1, wherein the polyesters for the production of the outer layers of the film comprise a quantity of <23% by weight, based on the weight of the respective outer layer, of isophthalic-acid-derived repeating units, and the proportion of cyclohexanedimethanol-derived repeating units in the polyesters of the entire film is <2% by weight, based on the weight of the entire film.

11. Polyester film according to claim 10, wherein the polyesters for the production of the outer layers of the film comprise a quantity of <19% by weight, based on the weight of the respective outer layer, of isophthalic-acid-derived repeating units.

12. Polyester film according to claim 10, wherein the polyesters for the production of the outer layers of the film comprise a quantity of <15% by weight, based on the weight of the respective outer layer, of isophthalic-acid-derived repeating units.

13. Polyester film according to claim 1, wherein the outer layers comprise <2% by weight, of repeating units which differ from ethylene-glycol- and terephthalic-acid-derived repeating units, and/or are polyesters produced by way of the PTA (purified terephthalic acid) route.

14. Polyester film according to claim 13, wherein the outer layers comprise <1.5% by weight of repeating units which differ from ethylene-glycol- and terephthalic-acid-derived repeating units, and/or are polyesters produced by way of the PTA (purified terephthalic acid) route.

15. Polyester film according to claim 1, wherein the polyesters used for the outer layers used titanium compounds as polycondensation catalyst and/or used magnesium compounds or manganese compounds as transesterification catalysts.

16. Polyester film according to claim 1, wherein the proportion of returned regrind is less than 70% by weight, based on the total weight of the extrudate in all of the layers, and/or that the Yellowness Index YID of the film is less than 3.0.

17. Polyester film according to claim 16, wherein the proportion of returned regrind is less than 60% by weight, based on the total weight of the extrudate in all of the layers.

18. Polyester film according to claim 16, wherein the proportion of returned regrind is less than 55% by weight, based on the total weight of the extrudate in all of the layers.

19. Polyester film according to claim 1, wherein said rough outer layer A has a thickness from 1 to 2.3 μm and said smooth outer layer C has a thickness of at least 1.8 μm.

20. Polyester film according to claim 2, wherein the rough outer layer A comprises from 0.1 to 0.45% by weight based on the weight of the outer layer A, of calcium carbonate particles.

21. An at least three-layer biaxially oriented polyester film, comprising at least one base layer B, one rough outer layer A and one smooth outer layer C, where the outer layers A and C are respective external layers arranged on the opposite surfaces of the base layer B, where the outer layer A comprises calcium carbonate particles, the outer layer C comprises less than 0.1% by weight of particles, where the percentage by weight data are based on the weight of the respective layer, and where the polyester used for the production of all the layers of the at least three-layer polyester film comprises, as repeating unit, no 2,6-naphthalenedicarboxylic-acid-derived units, and where the entire film comprises less than 0.3% by weight, based on the weight of the entire film, of particles, the smooth outer layer C has a roughness, Sa, of less than 25 nm and said film does not comprise a coating.

22. Polyester film according to claim 21, wherein the film further comprises particles made of incompatible polymers.

23. Polyester film according to claim 21, wherein the film comprises less than 0.2% by weight, based on the weight of the entire film, of titanium dioxide particles and/or barium sulphate particles.

24. Polyester film according to claim 23, wherein the film comprises less than 0.1% by weight, based on the weight of the entire film, of titanium dioxide particles and/or barium sulphate particles.

25. Polyester film according to claim 23, wherein the film comprises 0% by weight, based on the weight of the entire film, of titanium dioxide particles and/or barium sulphate particles.

26. Polyester film according to claim 21, wherein the film further comprises silicon dioxide particles and/or aluminium trioxide.

27. Polyester film according to claim 26, wherein the film comprises less than 0.25% by weight, based on the weight of the entire film, of silicon dioxide particles and/or aluminium trioxide.

28. Polyester film according to claim 26, wherein the film comprises less than 0.01% by weight, based on the weight of the entire film, of silicon dioxide particles and/or aluminium trioxide.

29. Polyester film according to claim 21, wherein the rough outer layer A has a roughness, Sa, ranging from 25 to 50 nm and wherein said film comprises less than 0.01% of particles other than the calcium carbonate particles and polyester catalyst residue particles.

30. Polyester film according to claim 21, wherein the particles within said film consist of calcium carbonate and, optionally, catalyst residue.

31. Polyester film according to claim 21, wherein the outer layer A comprises from 0.1 to 0.45% by weight based on the weight of the outer layer A, of calcium carbonate particles.

32. Furniture surfaces comprising a film according to claim 1 for the provision of surface properties.

33. At least three-layer biaxially oriented polyester film according to claim 1 comprising at least one base layer B, one rough outer layer A and one smooth outer layer C, where the outer layers A and C are respective external layers arranged on the opposite surfaces of the base layer B, and where the film has the following properties:

transparency from 80 to 95% haze <7% total film thickness from 12 to 75 μm a smooth outer layer C with roughness value Sa<25 nm, Sp<500 nm a smooth outer layer C with thickness at least 1 μm a rough outer layer A with roughness value Sa ≥25 nm, Sp ≥500 nm; and transmittance in the wavelength range from 330 nm to 400 nm that is greater than 50% at each wavelength in the stated range, preferably greater than 60% and particularly preferably greater than 72%.

34. At least three-layer biaxially oriented polyester film according to claim 33, wherein the transmittance in the wavelength range from 330 nm to 400 nm that is greater than 60% at each wavelength in the stated range.

35. At least three-layer biaxially oriented polyester film according to claim 33, wherein the transmittance in the wavelength range from 330 nm to 400 nm that is greater than 72% at each wavelength in the stated range.

36. Process for producing a polyester film according to claim 1 comprising first compressing the polyester or the polyester mixture of the individual layers and rendering them flowable in a plurality of extruders, shaping the melts in a coextrusion die to give a flat melt film, drawing off the flat melt film on a chill roll and on one or more take-off rolls in the form of prefilm, cooling and hardening the prefilm and then biaxially orienting the hardened prefilm, wherein the outer layer A comprises calcium carbonate particles, the outer layer C comprises less than 0.1% by weight of particles, where the percentage by weight data are based on the weight of the respective layer, and the polyester for the production of all of the layers of the at least three-layer polyester film comprises, as repeating unit, no 2,6-naphthalenedicarboxylic-acid-derived units, and the entire film comprises less than 0.3% by weight, based on the weight of the entire film, of particles.

* * * * *